Figure 1:
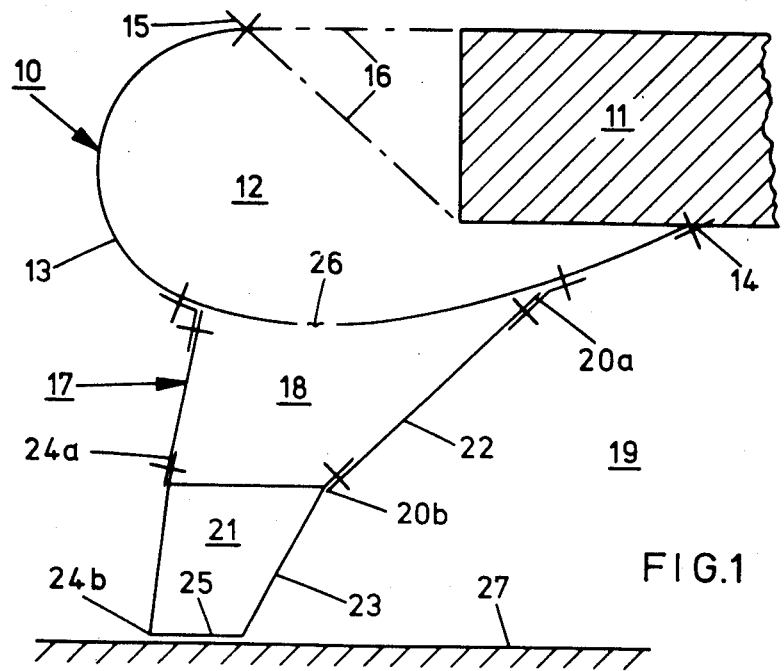

United States Patent [19]

Henry

[11] 3,990,533
[45] Nov. 9, 1976

[54] SKIRTS FOR AIR CUSHION VEHICLES

[75] Inventor: John Henry, Cowes, England

[73] Assignee: British Hovercraft Corporation Limited, Yeovil, England

[22] Filed: Feb. 13, 1975

[21] Appl. No.: 549,808

[30] Foreign Application Priority Data
Feb. 22, 1974 United Kingdom............... 8293/74

[52] U.S. Cl. .............................................. 180/127
[51] Int. Cl.² ........................................ B60V 1/16
[58] Field of Search ............ 180/127, 121, 116, 117, 180/120, 128

[56] References Cited
UNITED STATES PATENTS

| | | | |
|---|---|---|---|
| 3,333,650 | 8/1967 | Hardy et al. | 180/128 |
| 3,536,156 | 10/1970 | Crago | 180/128 |
| 3,618,695 | 11/1971 | Wheeler | 180/128 |
| 3,643,757 | 2/1972 | Delamare | 180/127 |
| 3,643,758 | 2/1972 | Winter | 180/128 |
| 3,756,343 | 9/1973 | Joyce, Jr. | 180/127 |
| 3,863,732 | 2/1975 | Crewe | 180/128 |

FOREIGN PATENTS OR APPLICATIONS
1,190,206    4/1970    United Kingdom............... 180/127

Primary Examiner—M. H. Wood, Jr.
Assistant Examiner—Jack D. Rubenstein
Attorney, Agent, or Firm—Larson, Taylor & Hinds

[57] ABSTRACT

An air cushion vehicle flexible skirt assembly includes a plurality of skirt elements. Each skirt element comprises a first section including an endless band of flexible material. A second section of the element includes a plurality of members each comprising an endless band of flexible material having a peripheral dimension which is less than the peripheral dimension of the first section. The members comprising the second section are each joined at one of their edges to one of the edges of the endless flexible band comprising the first section to constitute an extension thereof. If desired, these skirt elements may depend from a bag member forming another part of the flexible skirt assembly.

8 Claims, 2 Drawing Figures

SKIRTS FOR AIR CUSHION VEHICLES

This invention relates to air cushion vehicle flexible skirt assemblies, and is more particularly concerned with a skirt element having particular application as a part of the flexible skirt assembly at the rear of the vehicle.

That part of a flexible skirt assembly extending across the rear of an air cushion vehicle presents conflicting requirements. In order to minimise pressurized air losses from the cushion at the rear end of the vehicle when it is travelling with a forward component of motion, it is desirable to maintain the lower edge of the skirt assembly at the rear end of the vehicle in continuous contact with the surface. In attempting to achieve this object the drag on the forward motion of the vehicle is increased and the lower edge of the barrier is subjected to a high rate of wear. It is desirable, therefore, to provide a flexible skirt assembly at the rear of the vehicle which, when required, is capable of giving way to large obstacles, whilst having the facility to readily yield to small obstacles, and to conform to undulations in the surface over which the vehicle is operating, without allowing excessive amounts of cushion air to escape. At the same time it is preferable that the lower part of this barrier portion, which is subjected to the highest wear rate, shall be readily detachable so that it can be easily replaced when worn. In meeting these requirements care must be taken to ensure that the skirt does not scoop up water when the vehicle is operating on or over a water surface, thus considerably increasing the drag.

It is to be understood that the term "air cushion vehicle" used in this specification includes any vehicle supported predominantly by a self-generated cushion of pressurized air contained between the vehicle and the surface, including Surface Effect Ships, Surface Effect Vehicles, and Sidewall Hovercraft.

In one aspect the invention provides, for an air cushion vehicle flexible skirt assembly, a skirt element having first and second sections, the first section comprising a member formed from an endless band of flexible material extending from a first edge to terminate at a second edge, the second section comprising a plurality of members each formed from an endless band of flexible material extending from a first edge to terminate at a second edge and having a smaller peripheral dimension than the endless band comprising the first section, the first edges of the endless band members comprising the second section being attached to the second edge of the endless band member comprising the first section.

Another aspect of the invention provides an air cushion vehicle having a flexible skirt assembly extending across the rear end so as to provide, in operation, a cushion seal between the underside of the vehicle and a surface above which the vehicle is supported, the skirt assembly including a plurality of inflatable skirt elements, each skirt element having a first section and a second section, the first section comprising a member formed from an endless band of flexible material extending downwardly from a first edge to terminate at a second edge, the second section comprising a plurality of members each formed from an endless band of flexible material extending downwardly from a first edge to terminate at a second edge and being of smaller peripheral dimension than the endless band member comprising the first section, the first edges of the endless band members comprising the second section being attached in part to the second edge of the endless band member comprising the first section.

The members comprising the first and second sections of the skirt elements may taper inwardly from their first edges to their second edges so that, when inflated, each member has a cross-sectional shape which is substantially that of a truncated cone.

A flexible diaphragm may be attached to the second edge of each endless band member comprising the second section of a skirt element, so as to seal that end of the member. Alternatively, the ends of these members may be left open so that, in operation, pressurized air inflating the skirt element flows out from the bottom of the element.

When used in combination with an air cushion vehicle, the skirt elements may be attached direct to the vehicle or they may be attached to some intermediary structure such as, for example, a bag member comprising a flexible inflatable membrane.

Figure 2:
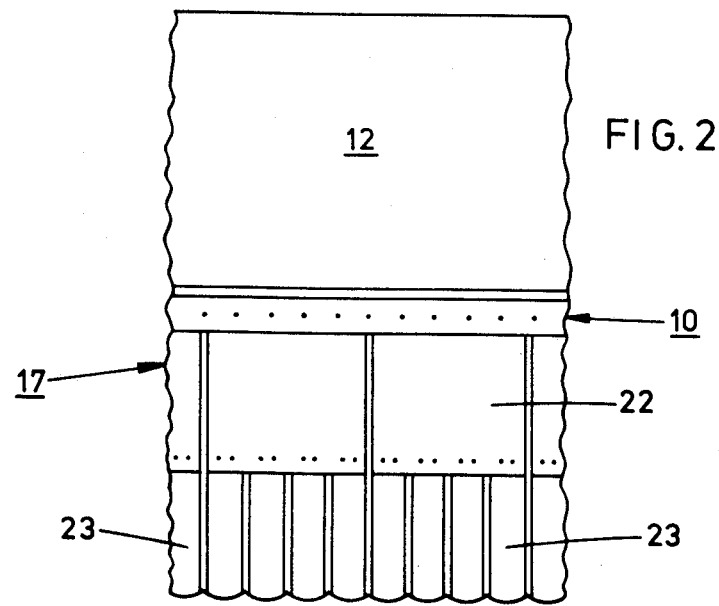

One embodiment of the invention will now be described, by way of example, with reference to the accompanying drawings, in which:

FIG. 1 is a diagrammatic section of a skirt assembly including skirt elements according to the invention, and FIG. 2 is an elevation at 90° to FIG. 1 of part of the skirt shown in FIG. 1.

In FIG. 1 of the drawings a flexible skirt assembly 10 depends from a rigid base structure 11 of an air cushion vehicle that is not otherwise shown. The skirt assembly includes an inflated bag member 12 comprising a flexible membrane 13 secured at an inner attachment line 14 to the base structure 11, and at an outer attachment line 15 to structure (not shown) spaced from the base structure 11 by rigid struts represented by the chain lines 16. The bag member 12 extends across part of the vertical distance between the base structure 11 and a surface 27 over which the vehicle is operating to form part of the seal to the vehicle supporting cushion 19.

Attached to and depending from the bag member 12 are a plurality of skirt elements 17. Each skirt element 17 has a first section 18 and a second section 21. The first section 18 comprises a member 22 formed from an endless band of flexible impermeable material extending downwardly from a first edge 20a, attached by suitable means (not shown) to the bag member 12, to terminate at a second edge 20b. The second section 21 comprises a plurality of members 23 each formed from an endless band of flexible material, having a smaller peripheral dimension than the peripheral dimension of the endless band member 22 comprising the first section 18, and extending from a first edge 24a to terminate at a second edge 24b. The members 23 are attached in part at their first edges 24a by suitable releasable fastening means (not shown) to the second edge 20b of the member 22.

The member 22 and the members 23 taper inwardly from their first edges to their second edges and each has a shape which is substantially that of a truncated cone as viewed in FIG. 1.

In this embodiment a flexible diaphragm 25 is sealed to the second edge 24b of each member 23 so as to close that end of the member. Each skirt element 17 aligns with an orifice 26 in the bag member 12 and is inflated by pressurized air passing from the bag member 12 by way of the orifice 26.

Skirt elements in accordance with the invention, wherein adjacent ones of the first sections are movable relative to each other upon encountering an obstacle, and adjacent members of each second section are movable relative to each other upon encountering an obstacle, with the first sections juxtaposed in side-by-side relationship, and the members of each second section are juxtaposed in side-by-side relationship, and the end members of each second section being juxtaposed in side-by-side relationship with the end members of adjacent second sections, when included as at least the lower portion of a skirt assembly extending across the rear end of an air cushion, have the advantage that large obstacles are able to pass between the individual skirt elements, whilst only the members forming the lower part of each element are required to yield for small obstacles and in order for the skirt hemline to conform to the surface above which the vehicle is supported. At the same time, the members forming the lower part of each skirt element which is in continual contact with the surface, are easily replaced when they become worn without incurring the expense of replacing a complete skirt element.

Of course the embodiment has been described by way of example only and a number of modifications can be made without departing from the scope of the invention. For example, the skirt elements may be attached direct to rigid structure of the vehicle. In this case they may be inflated by air flowing through ducts in the vehicle structure or by pressurized air from the cushion. The members comprising the second section need not be sealed by diaphragms at their second edges.

Although the skirt elements in accordance with the invention are preferred for use at the rear of the vehicle they are not limited to use at this location, but may be used as portions of the skirt assembly at other desired locations.

I claim:
1. An air cushion vehicle having a flexible skirt assembly depending therefrom, said assembly including a plurality of laterally adjacent skirt elements each comprising:
   a. a first upper section including an endless band of flexible material extending in a closed loop and having upper and lower edges;
   b. a second lower section including a plurality of individual laterally adjacent members each comprising an endless band of flexible material extending in a closed loop and having upper and lower edges;
   c. each said member of said second section having a peripheral dimension less than the peripheral dimension of said first section;
   d. each member of said second section being joined at its said upper edge to said lower edge of the said first section to constitute a partial extension thereof;
   e. and means coupling the upper edge of said first section to the vehicle so that said skirt element depends generally downwardly, with the lower edges of said second sections being adjacent a surface over which the vehicle may be travelling, comprising a bag member comprising a flexible inflatable membrane supported from said vehicle, and having said upper edge of said first section of each of said skirt elements attached, at least in part, to said bag member so as to extend downwardly therefrom,
   f. adjacent ones of said first sections being movable relative to each other upon encountering an obstacle, and adjacent members of each second section being movable relative to each other upon encountering an obstacle.

2. A skirt element as claimed in claim 1, wherein said endless band comprising said first section tapers inwardly from its upper edge to its lower edge.

3. A skirt element as claimed in claim 2, wherein each said endless band member comprising said second section tapers inwardly from its upper edge to its lower edge.

4. A skirt element as claimed in claim 3 having a flexible diaphragm attached to said lower edge of each said endless band member comprising said second section so as to seal that end of said second member.

5. An air cushion vehicle as claimed in claim 1, wherein each said skirt element aligns with an orifice defined by said flexible membrane, so that, in operation of said vehicle, pressurized air inflating said bag member is able to pass by way of said orifices to inflate said skirt elements.

6. Apparatus as claimed in claim 1 wherein said first sections are juxtaposed in side-by-side relationship, and the members of each second section are juxtaposed in side-by-side relationship, the end members of each second section being juxtaposed in side-by-side relationship with the end members of adjacent second sections.

7. An air cushion vehicle as claimed in claim 1 wherein the endless band of flexible material of said first section extends in a closed loop to define a substantially hollow member having open upper and lower ends at said upper and lower edges, respectively, and the endless band of flexible material of each member of said second section extends in a closed loop to define a substantially hollow member having upper and lower ends at said upper and lower edges, respectively, and said members of said second section are each joined at their upper edges to the lower end of said first section by releasable fastening means so as to facilitate replacement of said second sections.

8. An air cushion vehicle as claimed in claim 1 wherein said skirt assembly extends across the rear end of said vehicle.

* * * * *